United States Patent [19]
Bratlie et al.

[11] Patent Number: 5,344,271
[45] Date of Patent: * Sep. 6, 1994

[54] TRAILER DUMPER

[75] Inventors: Kenneth A. Bratlie; David J. Miller, both of Portland, Oreg.

[73] Assignee: Columbia Trailer Co., Inc., Hillsboro, Oreg.

[ * ] Notice: The portion of the term of this patent subsequent to Jan. 14, 2009 has been disclaimed.

[21] Appl. No.: 822,612

[22] Filed: Jan. 14, 1992

Related U.S. Application Data

[63] Continuation-in-part of Ser. No. 549,213, Jul. 5, 1990, Pat. No. 5,080,548.

[51] Int. Cl.[5] .................................... B65G 67/30
[52] U.S. Cl. ...................................... 414/385; 298/7; 298/17 SG; 414/368; 414/386; 414/471; 414/481; 414/577; 414/582; 414/786
[58] Field of Search ............... 298/7, 11, 17 SG, 22 R; 414/362, 368, 376, 385, 386, 391, 399, 401, 469, 471, 575, 577, 582, 481, 786

[56] References Cited

U.S. PATENT DOCUMENTS

| | | | |
|---|---|---|---|
| 516,053 | 3/1894 | Hulett | 414/362 |
| 577,500 | 2/1897 | Wilson | 414/376 |
| 1,759,757 | 5/1930 | Patten et al. | 414/362 X |
| 3,819,070 | 6/1974 | Clarke et al. | 414/362 |
| 4,483,650 | 11/1984 | Sims | 298/11 X |

OTHER PUBLICATIONS

Appendix A showing a copy of a prior art trailer tipper manufactured and sold by Columbia Trailer Co., Inc.
Appendix A: High-Profile prior art tipper made by Columbia Trailer Co.

*Primary Examiner*—Michael S. Huppert
*Assistant Examiner*—Janice Krizek
*Attorney, Agent, or Firm*—Klarquist Sparkman Campbell Leigh & Whinston

[57] ABSTRACT

A portable low-profile tipper for dumping the contents from a trailer containing a dumpable material, includes a towable elongated and angled frame having a portion resting on the ground during dumping for greater stability. A deck is pivotally attached at an elevated position to the frame back end. The deck has a backstop for positioning the trailer during dumping. Actuators raise and lower the deck to dump the trailer contents. The tipper has a chute with fixed and pivoting components cooperating to guide the dumpable material from the trailer past the frame back end. Front and back stabilizers extend outwardly from the frame. The front stabilizers lift and lower the frame front end between a low-profile dumping position and a raised towing position. A method of successively removing the contents from a plurality of trailers using the tipper is also provided.

23 Claims, 8 Drawing Sheets

TRAILER DUMPER

BACKGROUND OF THE INVENTION

This is a continuation-in-part of co-pending application Ser. No. 07/549,213 filed Jul. 5, 1990, granted U.S. Pat. No. 5,080,548 having a Jan. 14, 1992 issue date.

The present invention relates generally to a trailer tipper or dumper for dumping the contents from a trailer containing a dumpable material, and more particularly to an improved portable tipper and an improved method of removing the contents from such a trailer. For example, such a tipper and method may be used to dump garbage from trailers at a landfill site.

Other portable trailer dumpers or tippers have been used to dump garbage from semi-truck haulable trailers at commercial dumps. One known tipper includes a haulable frame having a front end hitchable to a semi-truck for moving the tipper between different dumping locations.

This known tipper includes an upwardly pivoting deck attached to the frame back end. The deck has an upwardly extending backstop adjacent the back end of the deck to retain a trailer during tipping. Two hydraulic actuators are mounted to the frame and underside of the deck to push the deck from a lowered position in contact with the frame upwardly to a raised position for dumping the contents of the trailer. To power the hydraulic actuators, the tipper includes a hydraulic power unit mounted to the frame underside midway between the frame front and back ends.

In a lowered position adjacent the frame, the deck is substantially level at a height of nearly eleven feet above the ground surface upon which the tipper is located. To bridge this distance, the tipper has a detachable ramp extending downward from the frame front end. The frame also includes a permanently mounted intermediate ramped section for bridging a gap between the deck and the detachable ramp.

This known tipper includes front and rear stabilizer wings extending outwardly from the frame sides, with each wing having a ground-engaging float with screw-type height adjustment means. The stabilizers are adjustable to level the deck. The stabilizer floats are removed from the stabilizer wings and the wings are folded back against the frame for towing the tipper between dumping locations. To ready the tipper for moves between locations at a given site, the stabilizer floats and ramp must be removed and placed on top of the tipper.

To use this known tipper, a driver backs a trailer containing a dumpable material onto the detachable ramp, across the intermediate ramp and onto the deck until the trailer engages the deck backstop. To unhook the trailer for dumping, the driver gets out of the truck cab, which is nearly as high as the deck (approximately eleven feet above the ground surface). Any fall from such a height may seriously injure the driver. Thus, this tipper requires hand rails and barriers along the edges of the ramps and deck.

The basic manufacturing costs of such hand rails and barriers increase the initial cost of the known tipper. Furthermore, there are the labor costs associated with disassembling and reassembling the hand rails and barriers when moving the tipper from one location at a dump site to another location at the same dump site.

Tippers are inherently susceptible to side loading when the deck is elevated to dump a trailer. For example, side loading may occur when a strong cross wind blows against a side of a trailer during dumping. The deck acts as a moment arm and side loading force applies a torque to the frame. To prevent frame deformation by twisting during such side loading, this known frame requires great amounts of reinforcing steel and larger and heavier steel members in the frame. The additional reinforcing steel increases tipper manufacturing costs, as well as making the tipper heavy to haul, which increases fuel costs associated with moving the tipper.

Thus, a need exists for an improved trailer tipper and method for dumping the contents from a trailer containing a dumpable material, which is not susceptible to the above limitations and disadvantages.

SUMMARY OF THE INVENTION

According to one aspect of the present invention, a portable tipper is provided for dumping the contents from a trailer containing a dumpable material through a back opening of the trailer. The portable tipper has a low-profile and includes a towable elongated frame having a back end with a deck pivotally attached thereto. The deck has a backstop for positioning the trailer during dumping. Actuators raise and lower the deck between a lowered position adjacent the frame and a raised position for dumping the trailer contents. The tipper includes a chute having fixed and pivoting components which cooperate to guide the dumpable material from a back opening of the trailer past the frame back end. The tipper frame has outwardly extending front and back stabilizers. The front stabilizers lift and lower a front end of the frame between a low-profile dumping position for receiving the trailer and a raised towing position for hitching and towing the tipper between dumping locations. In an illustrated embodiment, the portable low-profile tipper has an elevated pivot means coupling the raisable deck to the frame, which achieves a greater trailer height while dumping. The illustrated tipper also has an angled frame so a portion of the frame rests on the ground during dumping for greater stability.

An overall object of the present invention is to provide an improved trailer tipper for dumping the contents from a trailer containing a dumpable material.

A further object of the present invention is to provide an improved portable tipper which may be moved between locations at a particular dump site quickly and efficiently.

An additional object of the present invention is to provide an improved method of removing the contents from a trailer containing a dumpable material.

A further object of the present invention is to provide a portable tipper which is safer to use than existing tippers without sacrificing performance.

Yet another object of the present invention is to provide a portable tipper which may be more economically manufactured, and which is more cost efficient to use than existing tippers.

DETAILED DESCRIPTION OF A PREFERRED EMBODIMENT

Figure 1:
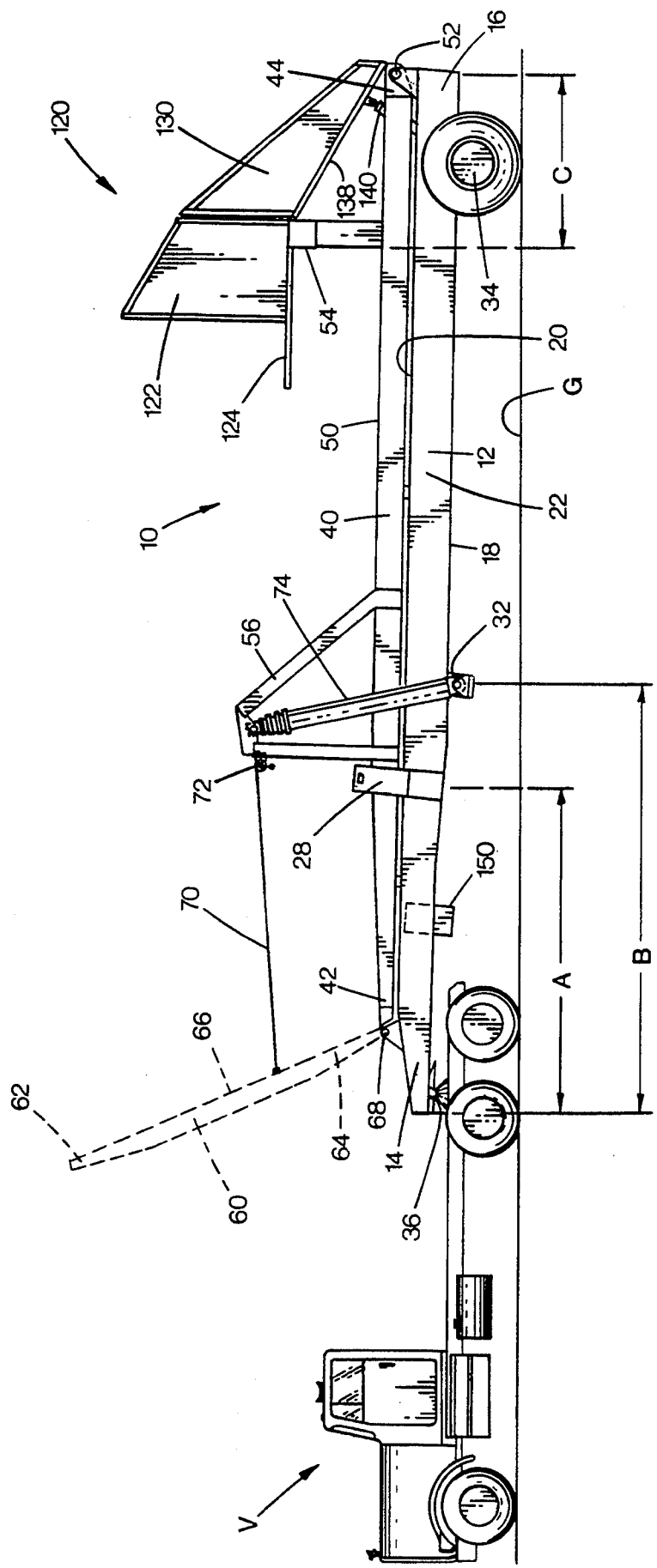
FIG. 1 is a side elevational view of one form of a portable tipper of the present invention, shown hitched to a towing vehicle, such as for transportation between first and second dump sites interconnected by conventional highways.
Figure 2:
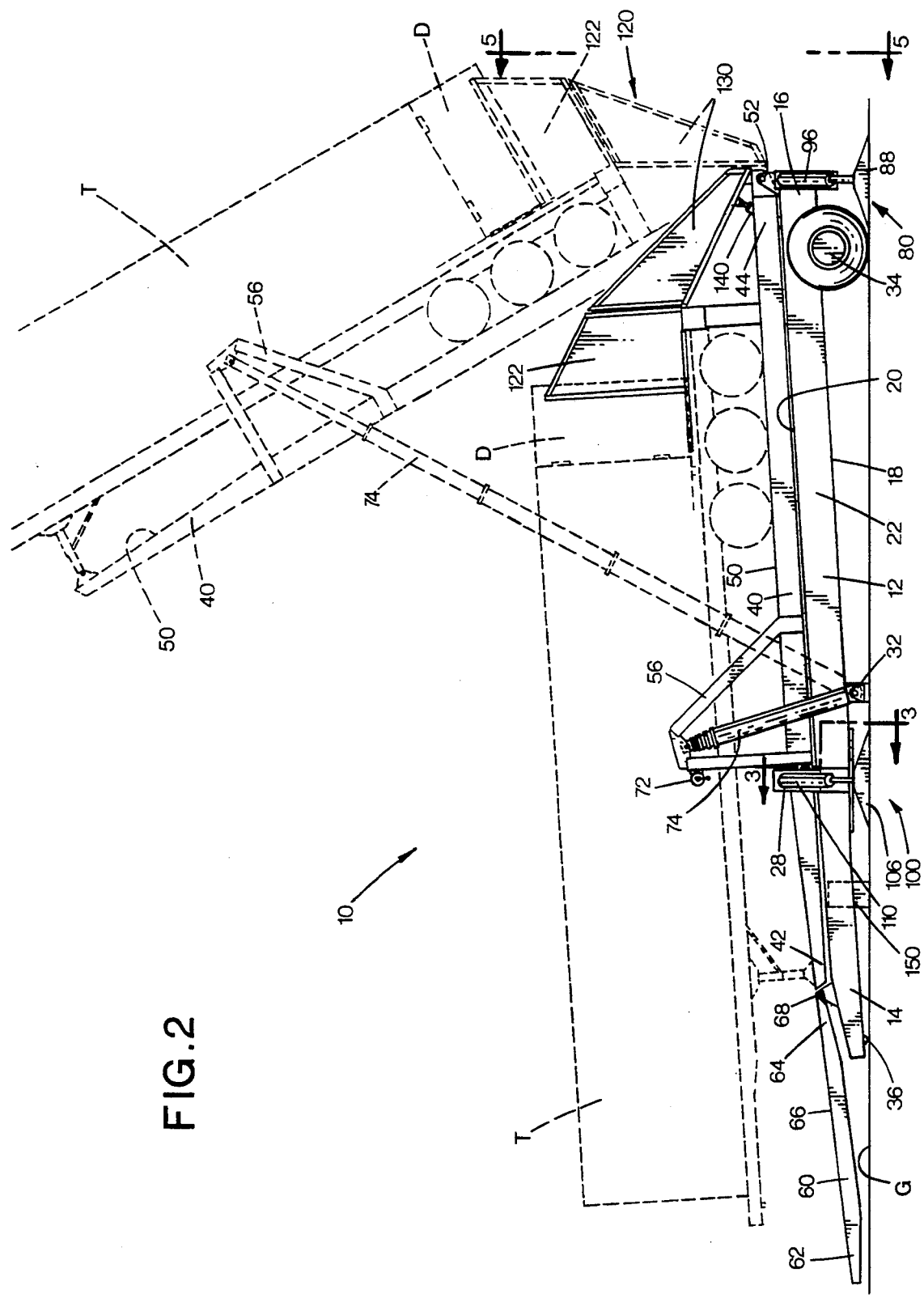
FIG. 2 is a side elevational view of the tipper of FIG. 1, showing the dumping of a trailer in dashed lines.

FIGS. 1 and 2 illustrate an embodiment of a portable, low-profile dumper or tipper 10 constructed in accordance with the present invention for dumping the contents from a trailer T containing a dumpable material (not shown). The contents are dumped through a back opening which is closeable by a door or doors D of the trailer T during transport. The dumpable material may be any type of material capable of being removed through the trailer back opening under the force of gravity when the trailer is tipped upwardly as shown in FIG. 2. For example, the dumpable material may be garbage which has been hauled to a dump or commercial landfill for deposit therein.

Figure 3:
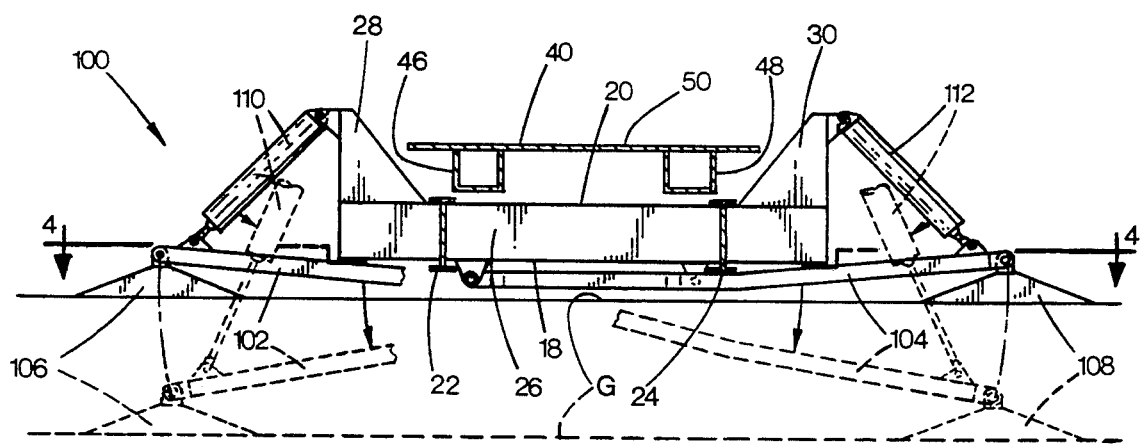
FIG. 3 is a cross-sectional elevational view taken along line 3—3 of FIG. 2.
Figure 4:
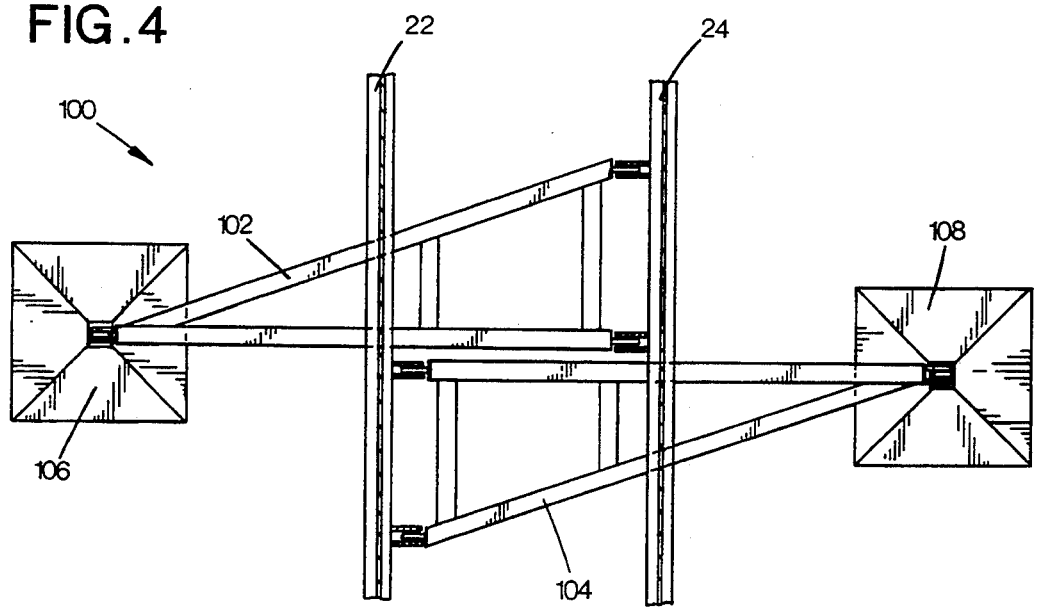
FIG. 4 is a cross-sectional plan view taken along line 4—4 of FIG. 3.

The tipper 10 has an elongated frame 12 having opposing front and back ends 14 and 16, an undersurface 18 and an upper surface 20. Referring also to FIGS. 3 and 4, the frame 12 also includes two opposing side members, such as I-beams 22 and 24, each running along the length of the tipper 10. The side I-beams may be interconnected at various positions along the length of the trailer by other structural steel support members, such as the square tubular cross member 26 which is welded to I-beams 22 and 24. The frame 12 also includes first and second opposing elevated mounting members 28 and 30 extending outwardly and upwardly from the respective I-beams 22 and 24 and the frame upper surface 20. The elevated mounting members 28 and 30 are located under a trailer T on the tipper 10 at a distance A from the forward-most point of the frame front end 14.

For purposes described further below, the frame 12 also includes a first lower mounting member 32 extending downwardly from the side I-beam 22 and a second lower mounting member (not shown) extending downwardly from the other side I-beam 24. The first and second lower mounting members, such as 32, are positioned along frame 12 at a distance B from the forward-most point of the frame front end 14.

For portability, the tipper frame 12 has a wheeled axle assembly 34 attached to the frame undersurface 18 adjacent the frame back end 16. The tipper 10 also includes towing or hitching means, such as hitch 36, mounted to the frame undersurface 18 adjacent the frame front end 14. Using hitch 36, the tipper may be hitched to a towing vehicle V, such as a semi-tractor or semi-truck, for towing the tipper 10, such as from a first dumping location to a second dumping location.

The tipper 10 also includes trailer support means, such as deck 40. The deck 40 has a front end 42, a back end 44, and two opposing side members 46 and 48. The side members 46 and 48 support a trailer-supporting upper surface 50 upon which the trailer T rests during dumping. The tipper 10 has means, such as pivot pin 52, for pivotally attaching the deck back end 44 to the frame back end 16. This pivotal attachment allows the deck 40 to be moved between a lowered position with the deck 40 adjacent the frame upper surface 20 and a raised position with the deck front end 42 elevated above the frame upper surface 20 (shown in dashed lines in FIG. 2) for dumping the contents from trailer T.

The deck 40 has a backstop 54 extending upwardly from the deck upper surface 50 at a distance C from the rearward-most edge of the deck back end 44. The deck 40 also has first and second elevated mounting means, each extending upwardly from one of the deck sides above the deck surface 50, such as a first elevated mounting member 56 extending upwardly from the deck side member 46.

In a preferred embodiment, the tipper 10 has optional ramp means, such as ramp 60 having front and back ends 62 and 64. The ramp 60 also has a vehicle and trailer supporting upper surface 66. The ramp back end 64 is pivotally attached to the frame front end 14, such as by pivot pin 68. The point of pivotal attachment is preferably located so the ramp back end 64 is adjacent the deck front end 42. In this embodiment, when the ramp 60 is in a lowered position, the ramp provides a smooth transition for the trailer T being driven between the deck 40 and a ground surface G surrounding the tipper 10 (see FIG. 2).

The ramp 60 may be pivoted upwardly to a raised position, as shown in dashed lines in FIG. 1, for moving the tipper 10, such as to a new location at a first dumping site. The ramp 60 may be secured in the raised position, such as by a cable 70 attached to an 0-ring 72 on the deck elevated mounting member 56. In a preferred embodiment, the ramp 60 is detachably attached to the frame front end 14, so that ramp 60 may be detached from the frame 12, for example by removing pin 68. It may be desireable to remove ramp 60 for highway travel, such as when moving the tipper 10 from one dumping site to another dumping site.

Elevating means is provided for coupling the deck 40 to the frame 12, such as a first multi-stage collapsible hydraulic actuator 74. The first actuator 74 has one end pivotally connected to the first deck elevated mounting member 56 and a second end pivotally connected to the first frame lower mounting member 32. A second actuator (not shown) is pivotally connected to the second deck elevated mounting member (not shown) and to the second frame lower mounting member (not shown). The elevating means is provided for pivotally raising and lowering the deck 40 between the lowered position and the raised position. The deck is illustrated in the lowered position with actuator 74 collapsed, and in the raised position with actuator 74 extended (shown in dashed lines in FIG. 2).

Figure 5:
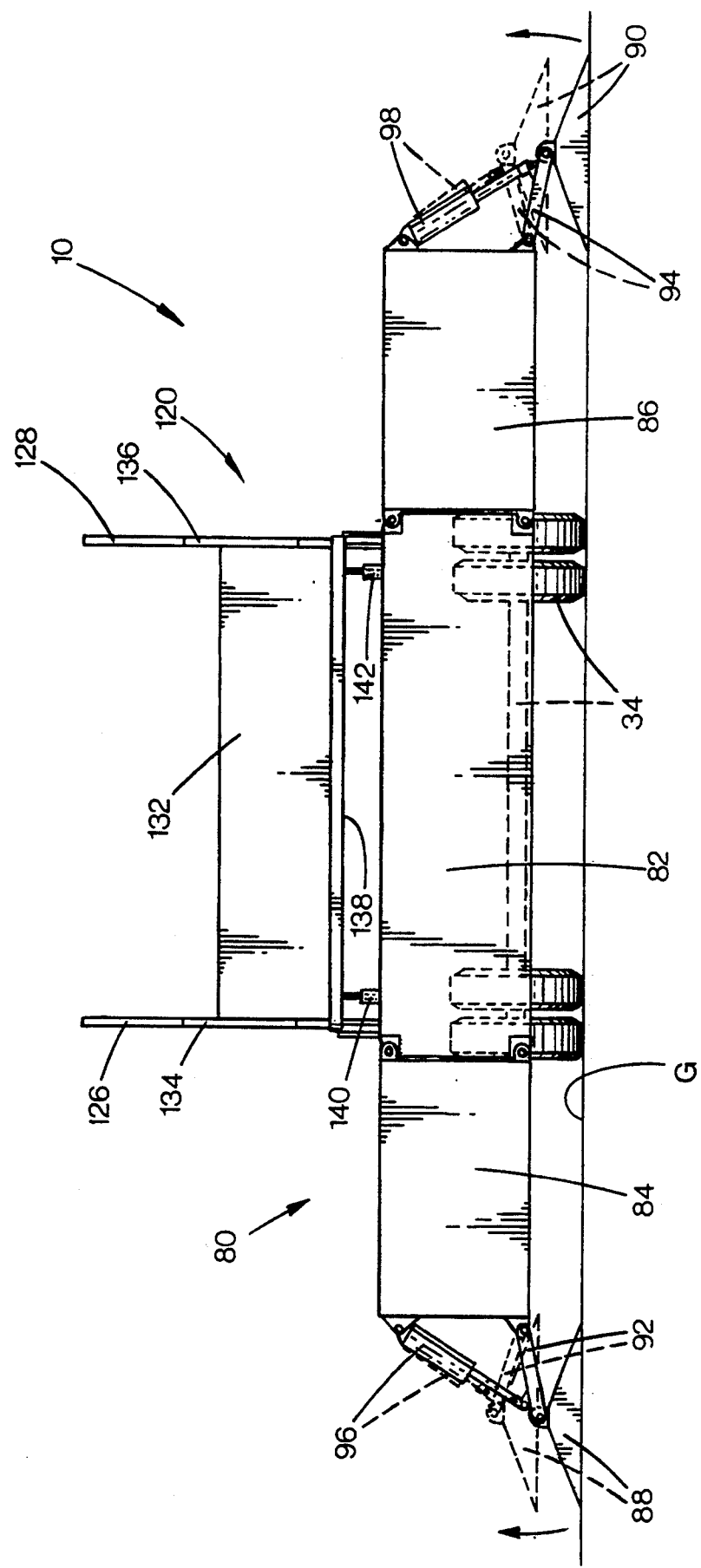
FIG. 5 is a rear elevational view taken along line 5—5 of FIG. 2.

Stabilizing means is attached to the frame 12 for stabilizing the tipper by engaging the ground surface G adjacent the tipper. Referring to FIG. 5, the stabilizing means includes back stabilizing means 80 having a central apron 82 which may be detachably attached to the frame back end 16 by pins or other means (not shown).

Pivotally attached to the outboard sides of apron 82 are wing members 84 and 86. The central apron 82 cooperates with wings 84 and 86 to shield and protect the wheeled axle assembly 34 from becoming fouled by the material which has been dumped behind the tipper 10. Ground engaging pads or floats 88 and 90 are attached to the respective wing members 84 and 86 by raisable means comprising links 92, 94 and hydraulic actuators 96 and 98.

Figure 6:
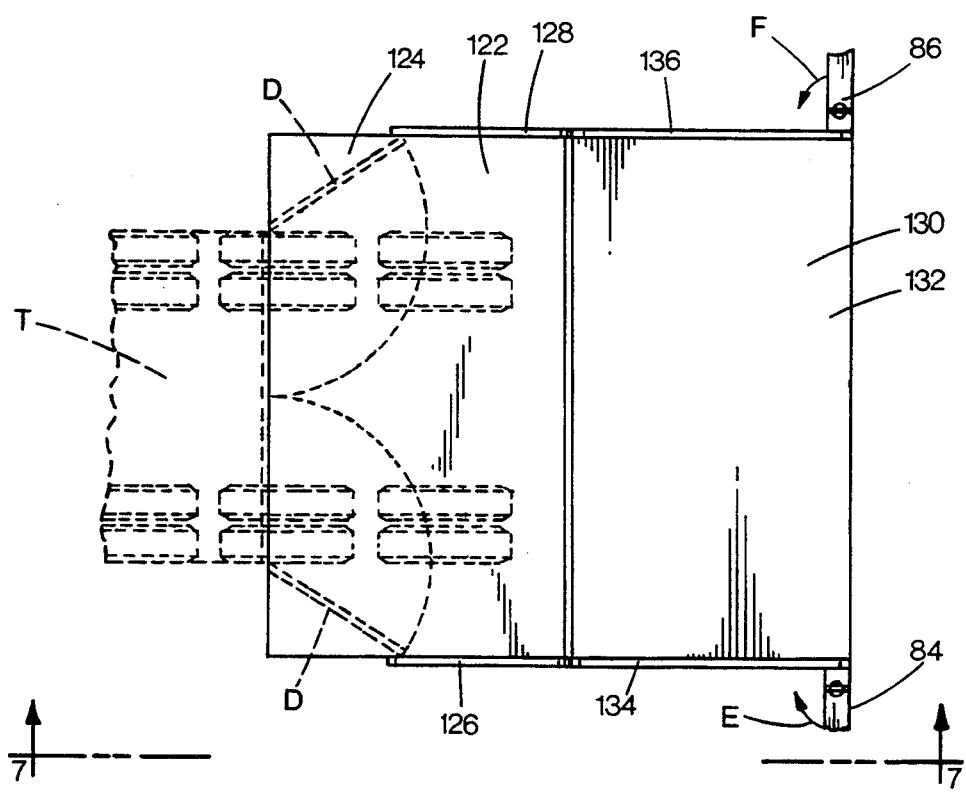
FIG. 6 is a partial plan view of the tipper of FIG. 2, showing the chute means.

For moving the tipper 10 to a new dumping location at a given dumping site, the back stabilizing means is raisable, as illustrated in dashed lines in FIG. 5. The actuators 96 and 98 are retracted to lift the respective pads 88 and 90 from the ground surface G. The pivotal attachment of wings 84 and 86 to apron 82 allows the wings to be folded forward along the frame sides as shown in FIG. 6 by arrows E and F, respectively. For highway travel, such as when moving the tipper 10 from the first dumping site to a second dumping site, the back stabilizing means 80 may be detached from frame 12 by removing pins or other attachment means connecting apron 82 to the frame back end 16. When removed, the back stabilizing means 80 may be placed on the deck upper surface 50 for such highway travel.

Referring now to FIGS. 3 and 4, the stabilizing means also includes front end stabilizing means 100. The front stabilizing means 100 comprises two opposing support members, such as A-frames 102 and 104 extending outwardly from each side of the frame 12. In the illustrated embodiment, A-frames 102 and 104 are pivotally attached to structural steel support members along the frame underside 18, such as cross member 26. A-frame 102 is attached adjacent I-beam 24 and extends under I-beam 22, while A-frame 104 is attached adjacent I-beam 22 and extends under I-beam 24. A-frames 102 and 104 each terminate in an outboard end having pivotal attachment means for receiving a ground-engaging float member, such as pads 106 and 108, respectively.

The front stabilizing means also includes two opposing frame lifting means, such as hydraulic actuators 110 and 112. Actuator 110 couples the outboard end of A-frame 102 to the first frame upper mounting member 28, while actuator 112 couples the outboard end of A-frame 104 to the second frame upper mounting member 30. The frame lifting means serve to lift and lower the frame front end 14.

To aid in imparting a low-profile dumping position to the tipper 10, the elevated mounting members 28 and 30 are elevated to a point above the deck upper surface 50 when the deck is in the lowered position. As shown in FIGS. 2 and 3, the front stabilizing means 100, with actuators 110 and 112 fully retracted, imparts a low-profile dumping position to the tipper 10. This low-profile position places the frame front end 14 near the ground surface G for receiving trailer T.

The front stabilizing means 100 may be used to hitch the tipper 10 to a towing vehicle V as shown in FIG. 1 for moving the tipper between locations. As shown in FIG. 3, the frame lifting actuators 110 and 112 are extended (shown in dashed lines) to lift the frame front end 14 to a raised towing position for attaching hitch 36 to the vehicle V as shown in FIG. 1. The front stabilizing means 100 may also be used for unhooking the tipper 10 from the vehicle V.

To move the tipper 10 between locations at a given dumping site, after hitching the tipper 10 to vehicle V, the front stabilizing means may be raised by retracting actuators 110 and 112 to disengage the ground G. For highway travel, such as between dump sites, the front stabilizing means 100 may be detached from frame 12. For example, the actuators 110 and 112 may be removed from the frame upper mounting members 28 and 30. The A-frames 102 and 104 may be removed from the frame undersurface 18. The actuators 110 and 112, the A-frames 102, 104 and the pads 106, 108 may be placed on the deck upper surface 50 during such highway travel.

In the low-profile dumping position, with the deck 40 in the lowered position, the deck upper surface 50 is inclined upwardly (relative to the ground surface G) toward the frame back end 16. The placement of the backstop 54 at the distance C (see FIG. 1) from the frame back end 16 provides an elevation to the trailer T during tipping comparable to, and in some cases greater than, the earlier known tipper previously discussed in the Background portion of this specification. Thus, the low-profile tipper 10 may perform at least as well as, if not better than, this earlier tipper.

There are additional advantages to the low-profile tipper 10. For example, a towing vehicle, such as the semi-truck V in FIG. 1, hitched to a trailer T may back the trailer onto the deck 40 and into engagement with backstop 54. In this position during unhitching and hitching of the trailer, the semi-truck back tires are supported by the ramp 60, while the front tires and the majority of the cab remains on the ground G. Thus, costly and cumbersome hand rails along ramp 60 are not required to protect the truck driver from falling off a ten foot or higher ramp and deck, as in the known tipper discussed in the Background portion above.

The close proximity of the front stabilizing means 100 and the frame lower mounting member 32 provides a stronger and more compact tipper 10. The compact tipper 10 is more resistant to frame deformation from side loading by wind gusts, etc., than the earlier known tipper discussed in the Background of this specification. Thus, the tipper 10 requires less structural steel support members than this known tipper, rendering tipper 10 lighter than the earlier known tipper. Less steel in the frame renders the tipper 10 more economical to manufacture as less materials and labor are required to assemble the tipper. Furthermore, the lightweight nature of tipper 10 advantageously yields greater fuel economy for the towing vehicle V.

Figure 7:
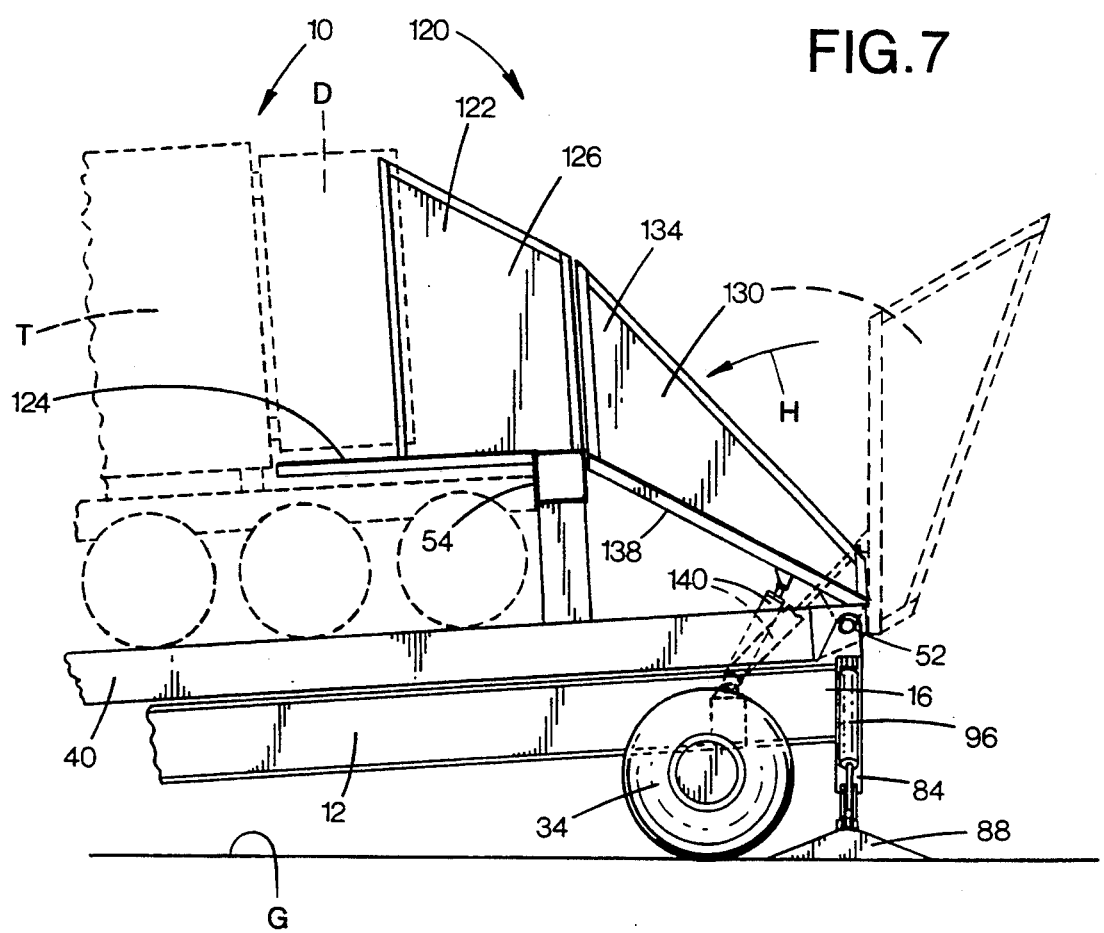
FIG. 7 is a side elevational view taken along line 7—7 of FIG. 6, showing the operation of the chute means in dashed lines.

Referring to FIGS. 6 and 7, the tipper 10 also includes chute means 120. The chute means 120 includes a stationary or fixed chute 122 mounted to and extending forwardly from the backstop 54. The fixed chute 122 includes a floor 124 extending from the backstop 54 forwardly to a point just beneath the trailer back opening. The fixed chute 122 also includes two opposing upwardly extending sidewalls 126 and 128 extending upwardly from a portion of each side of floor 124. The fixed chute 122 is sized so that the trailer doors D may be swung open as shown in dashed lines in FIG. 6 to engage the sidewalls 126 and 128. Latching means (not shown) may be included to secure the trailer doors D to the sidewalls 126 and 128 during dumping.

The chute means 120 also includes a pivoting chute 130 which is pivotally attached to the frame back end 16, such as by horizontal pivot pin 52. The pivoting chute 130 includes a floor 132 which extends forwardly from the point of pivotal attachment to the frame to meet with the rearward-most edge of the fixed chute floor 122. The chute floor 132 is fully bordered along each side by upright walls 134 and 136 which extend forwardly to meet the fixed chute sidewalls 126 and 128, respectively. The pivoting chute 130 also has an underside 138.

The trailer doors D, the fixed chute sidewalls 126 and 128, and the pivoting chute sidewalls 134 and 136 cooperate to direct the dumpable material from the trailer back opening to a point beyond the frame back end 16. As well as guiding the dumpable material, the chute sidewalls 126, 128, 134 and 136 aid in preventing the wind from blowing away the lighter weight components of the dumpable material, such as bits of paper or plastic if the dumpable material is garbage.

As shown in FIG. 7, after the contents have been dumped from trailer T, the deck 40 with the trailer T and fixed chute 122 may be lowered and the pivoting chute 120 may be left in a raised position, as shown in dashed lines. To retract the pivoting chute 130 to the lowered position, as indicated by arrow H, the chute means 120 also includes pivoting chute retracting means, which may include a pair of hydraulic actuators 140 and 142 (also see FIG. 5). As shown in FIG. 7, the chute retracting actuators, such as actuator 140, are retracted when the pivoting chute 130 is in a lowered position, and extended when the chute 130 is in a raised position (shown in dashed lines).

The tipper 10 also includes power means, such as power unit 150, which may be a 40 horsepower BRIGGS AND STRATTON engine or an electric motor powered by a 440 volt power source. The power unit 150 is advantageously mounted between cross member 26 and the forward-most point of the frame front end 14. This positioning of power unit 150 advantageously provides for better road balance of the tipper 10. This better road balance is achieved by a more even load distribution, wherein the weight of the power unit 150 offsets the weight of the chute means 120 near the back end of tipper 10. Thus, the tipper 10 hauls well at high speeds for highway travel.

In operation, the tipper 10 may be used to implement a method of successively removing the contents from a plurality of trailers T. The tipper 10 is positioned at a dumping location as shown in FIG. 2 by a towing vehicle V. A first trailer T hitched to a first towing vehicle (not shown) is backed onto ramp 60, and from ramp 60 onto the deck upper surface 50 and positioned on the deck against the backstop 54. The first trailer is then unhitched from the first towing vehicle. The trailer doors D are opened and latched in place against the fixed chute sidewalls 122 and 124. Of course, the doors could be opened first and the trailer unhitched afterward.

The deck 40 and the chute means 120 are raised by extending the elevating actuators, such as actuator 74, which also extends the chute actuators 140 and 142. In the raised position, the trailer contents fall under the influence of gravity from the trailer through the back opening. The trailer contents are guided by the doors D and chute means 120 to form a first pile (not shown) of dumpable material behind the tipper frame back end 16. In this manner, the first trailer is emptied.

The deck 40 is then lowered with the empty first trailer thereon to the lower position, adjacent the frame upper surface 20. During this lowering step, the pivoting chute 130 is left in the raised position (see FIG. 7). In a clearing away step, other equipment (not shown), such as bulldozers, blades and compactors may be used to remove the first pile from behind the tipper 10 while the pivoting chute 130 is in the upright position. The pile may be cleared away after dumping one trailer or after several trailers have been dumped, or if dumping over an embankment, clearing may not be required. During clearing, the raised chute 130 cooperates with the back stabilizing wings 84, 86 and apron 82 to prevent the dumped contents from being pushed forward onto the deck upper surface 20 and under the tipper.

In a successive clearing operation, while the first pile of dumpable material is being cleared from behind the tipper 10, the back doors D of the empty first trailer are closed and the trailer is hitched to the first towing vehicle. The empty first trailer is then driven off of deck 40 and ramp 60. This leaves the tipper 10 open so a second trailer may be backed by a second towing vehicle onto the tipper ramp 60, the deck upper surface 50 and positioned on the deck against backstop 54. The second trailer is unhitched from the second vehicle, and the doors D are opened and secured to the fixed chute sidewalls 126 and 128.

When the first pile of dumped material has been cleared away from behind the tipper 10, the pivoting chute 130 is lowered to the lower position by retracting the chute retracting actuators 140 and 142. When the chute 130 has been lowered and the doors D opened, the elevating actuators, such as actuator 74, extend to dump the contents from the second trailer T. In this manner, the steps above may be repeated with successive trailers to successively remove the contents from a plurality of trailers.

In a typical landfill application, the tipper 10 may be moved to new locations at a given dumping site four or five times daily. To do this, the ramp 60 may be raised and secured in a raised position by cable 70, as shown in FIG. 1. The front stabilizing means 100 is used to lift the tipper for hitching to a towing vehicle V as shown in FIGS. 1 and 3. When the tipper has been hitched, the front stabilizing pads 106 and 108 are retracted to the raised position by actuators 110 and 112, respectively. The back stabilizing pads 88 and 90 are retracted to the raised position by actuators 96 and 98, respectively. Wings 84 and 86 may be folded forward and against the frame 12, as indicated by arrows E and F in FIG. 6. In this configuration, the tipper may be moved to a new dumping location and returned to the dumping configuration shown in FIG. 2 by essentially reversing the above steps.

For moving the tipper 10 on a highway between dumping sites, the front and back stabilizing means 100 and 80, and the ramp 60 may be removed and placed on top of the deck upper surface 50.

Figure 8:
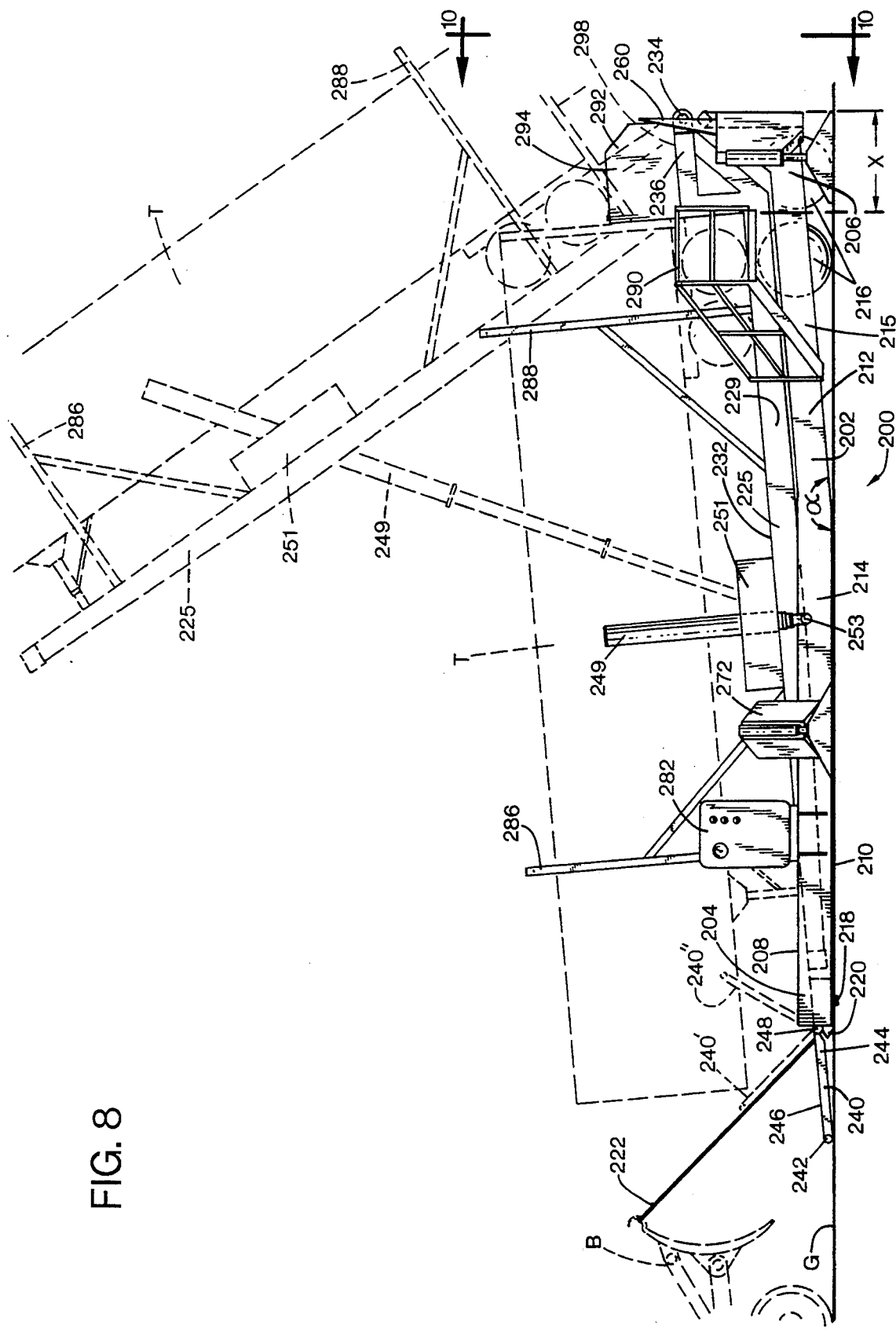
FIG. 8 is a side elevational view of an alternate form of a portable tipper of the present invention showing the dumping of a trailer in dashed lines.
Figure 9:
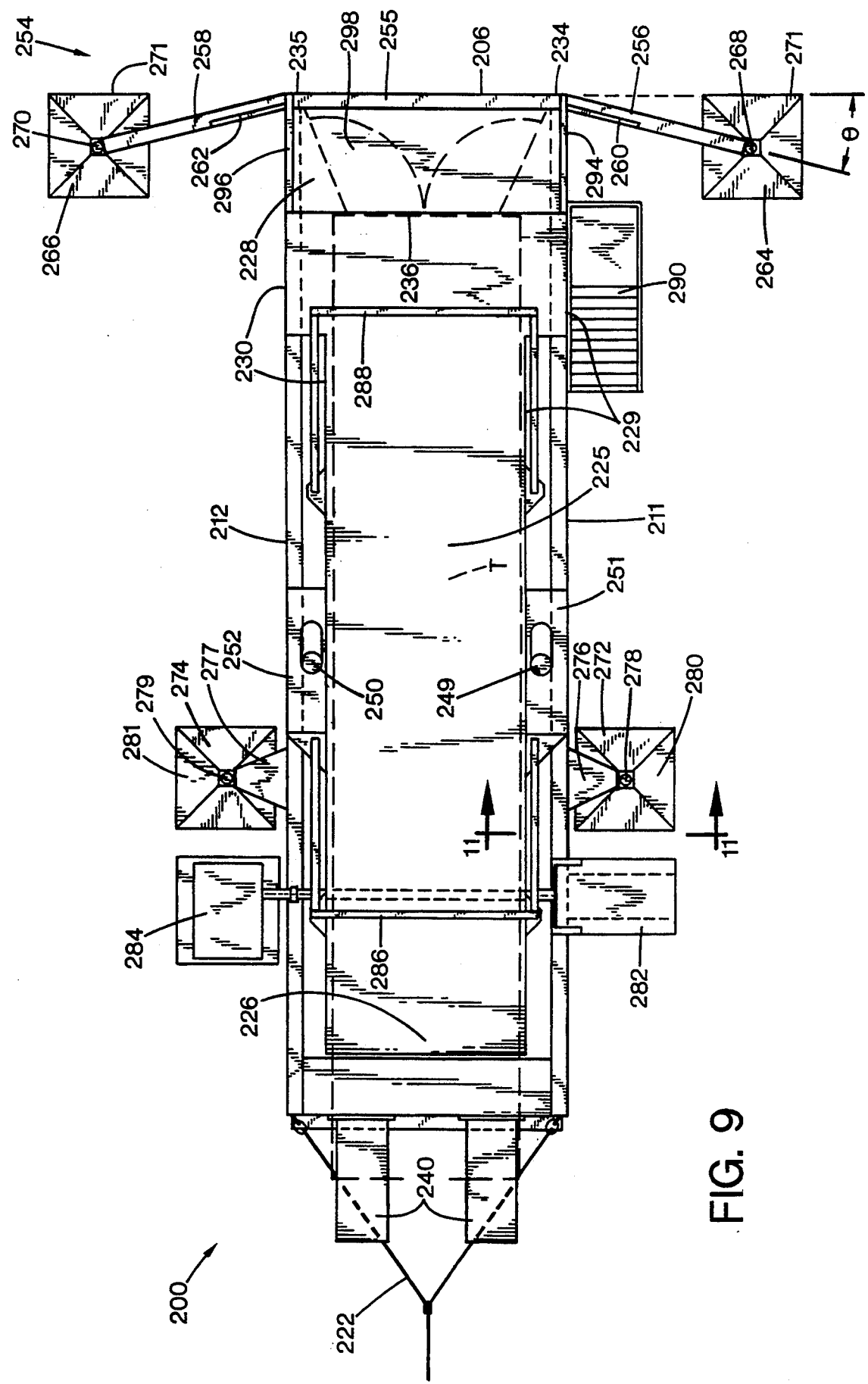
FIG. 9 is a plan view of the tipper of FIG. 8.

FIGS. 8 and 9 illustrate an alternate embodiment of a portable, low-profile dumper or tipper 200 constructed in accordance with the present invention for dumping the contents from a trailer T containing a dumpable material (not shown). The trailer T and dumpable material may be as described above with respect to the embodiments of FIGS. 1–7, with the trailer contents being dumped under the force of gravity when the trailer is tipped upwardly, as shown in dashed lines in FIG. 8.

The tipper 200 has an elongated frame 202 with opposing front and back ends 204 and 206, upper and lower frame surfaces 208 and 210, and two opposing lateral sides 211 and 212. The frame 202 is angled and includes a front ground-engaging portion 214 and a rear inclined portion 215, which is inclined upwardly with respect to the front portion 214 at a large obtuse angle α. When dumping, the front frame portion 214 engages the ground surface G to stabilize the tipper.

For portability, the tipper frame 202 has a wheeled axle assembly 216 attached to the lower frame surface 210 adjacent the frame back end 206. The tipper 200 also includes towing or hitching means, such as a hitch or king pin 218, mounted to the lower frame surface 210 adjacent the frame front end 204. The king pin 218 is removable so that the tipper 200 may lay flush with the ground G when in a dumping position. Using hitch 218, the tipper may be hitched to a towing vehicle V as shown and described above with respect to tipper 10 (see FIG. 1).

For ease of portability from one location to another at a single site, the tipper frame has a skid plate 220 attached to the lower frame surface 210 adjacent the frame front end 204. The tipper 200 has dragging means, such as a Y-shaped skid bridle or drag cable assembly 222, attached to the frame front end 204. The cable assembly 222 may be hitched to a piece of heavy equipment, such as a bulldozer B, which drags the tipper 200, resting on skid plate 220, between locations at a single dump site.

The tipper 200 also includes raisable trailer support means, such as a deck 225. The deck 225 has a front end 226, a back end 228, two lateral sides 229 and 230, and an upper surface 232. The tipper 200 has pivot means, such as two elevated pivots 234 and 235, for pivotally attaching the deck back end 228 to the frame back end 206. This pivotal attachment allows the deck 225 to be moved between a lowered position with the deck 225 adjacent the frame upper surface 208 and an inclined or raised dumping position, shown in dashed lines in FIG. 8.

The deck 225 has a backstop 236 extending upwardly from the deck upper surface 232 at a distance X from a rearward-most edge of the deck back end 228. The elevated pivots 234,235, and the distance X of the backstop 236 from the deck back end 228, work in conjunction to achieve a greater height from the ground G to the back end of trailer T than achieved by the tipper 10. This greater height imparts a larger potential energy to dumpable material in trailer T, as well as a greater vertical clearance for the dumpable material to accumulate behind the tipper 200.

In a preferred embodiment, the tipper 200 has ramp means, such as ramp 240 having front and back ends 242 and 244. The ramp may be a single piece unit (not shown), or the ramp comprises two ramp members as shown in FIG. 9. The ramp 240 has a vehicle and trailer supporting upper surface 246. The ramp back end 244 is pivotally attached to the frame front end 204, such as by pivot pin 248 (see FIG. 8). In this embodiment, when the ramp 240 is in a lowered position, the ramp provides a smooth transition for the trailer T being driven between the deck 225 and the ground surface G.

The ramp 240 may be pivoted upwardly to a raised dragging or skid transport position 240', as shown in dashed lines in FIG. 8. The ramp 240 may be raised to the dragging position 240' by tightening of the Y-shaped cable assembly 222 (see FIG. 9) as the bulldozer B begins dragging the tipper 200 With the ramp in position 240', the bulldozer B may then drag the tipper 200 to a new dumping location at the site. The ramp 240 may also be pivoted further upwardly to a raised highway travel position 240", also shown in dashed lines in FIG. 8. The ramp may be raised and lowered either manually or hydraulically by at least one hydraulic actuator (not shown) which could be powered in the manner described below for other actuators on the tipper 200.

With the ramp in the highway travel position 240", the tipper 200 may be transported by tractor-trailer V between dumping sites.

For elevatably coupling the deck 225 to frame 202, the tipper 200 has elevating means, such as two multistage collapsible hydraulic deck actuators 249 and 250, for raising and lowering the deck. The deck 225 has two mounting means, such as mounting members 251 and 252, extending upwardly from the deck sides 229 and 230, respectively. The lower ends of actuators 249 and 250 are pivotally connected to the deck mounting members 251 and 252, respectively, by conventional pivot mechanisms (not shown). The upper ends of actuators 249 and 250 are pivotally connected to the tipper lateral sides 211 and 212, respectively, such as at pivot 253 in FIG. 8.

Figure 10:
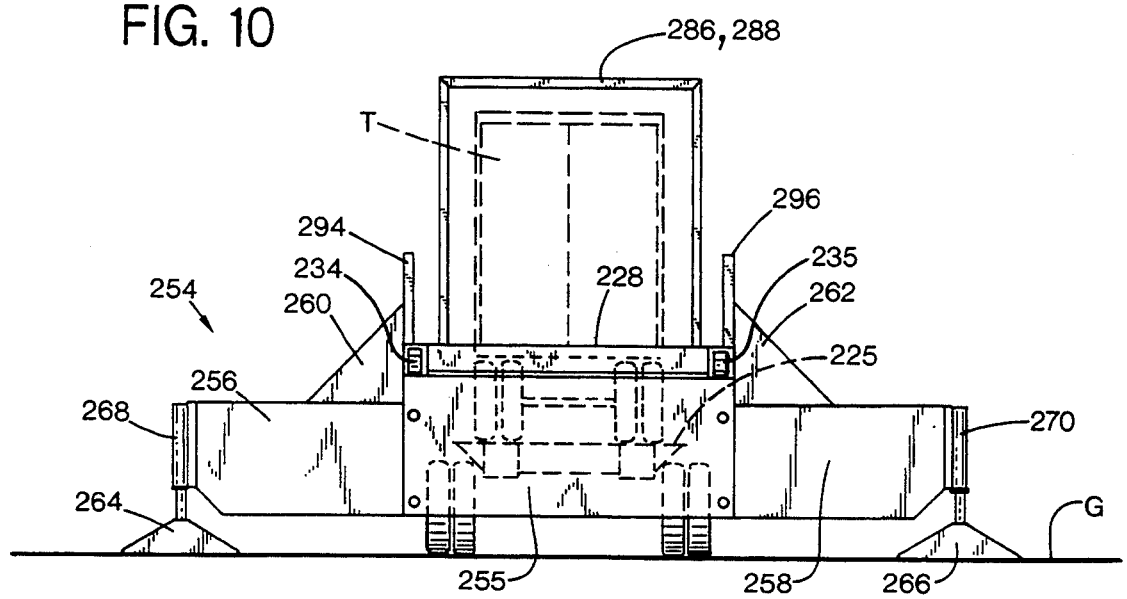
FIG. 10 is a rear elevational view taken along line 10—10 of FIG. 8.

Stabilizing means is attached to the tipper frame 202 for stabilizing the tipper by engaging the ground surface G adjacent the tipper. Referring to FIG. 10, the stabilizing means includes back stabilizing means, such as back stabilizers 254 having a central apron 255. The apron 255 may be detachably attached to the frame back end 206 by pins or other means (not shown). Two wing members 256 and 258 are attached to the outboard sides of apron 255. Two skirts 260 and 262 are detachably attached to the top of each wing member 256 and 258, respectively, adjacent to the apron 255. The central apron 255 cooperates with the wings 256, 258 and the skirts 260, 262 to shield and protect the wheeled axle assembly 216 from becoming fouled by the dumpable material which has been dumped behind the tipper 200.

Two ground engaging pads or floats 264 and 266 are attached to the respective wing members 256 and 258 by hydraulic actuators 268 and 270. As best shown in FIG. 9, the wing members 256 and 258 are angled toward the tipper front end 204 by an angle $\phi$ from the apron 255. Thus, the rear edges 271 of the pads 264, 266 are aligned with or located forward of the tipper back end 206. In this manner, the pads 264, 266 are not damaged by bulldozers and other equipment (not shown) clearing away the dumpable material from behind tipper 200 after dumping.

Figure 11:
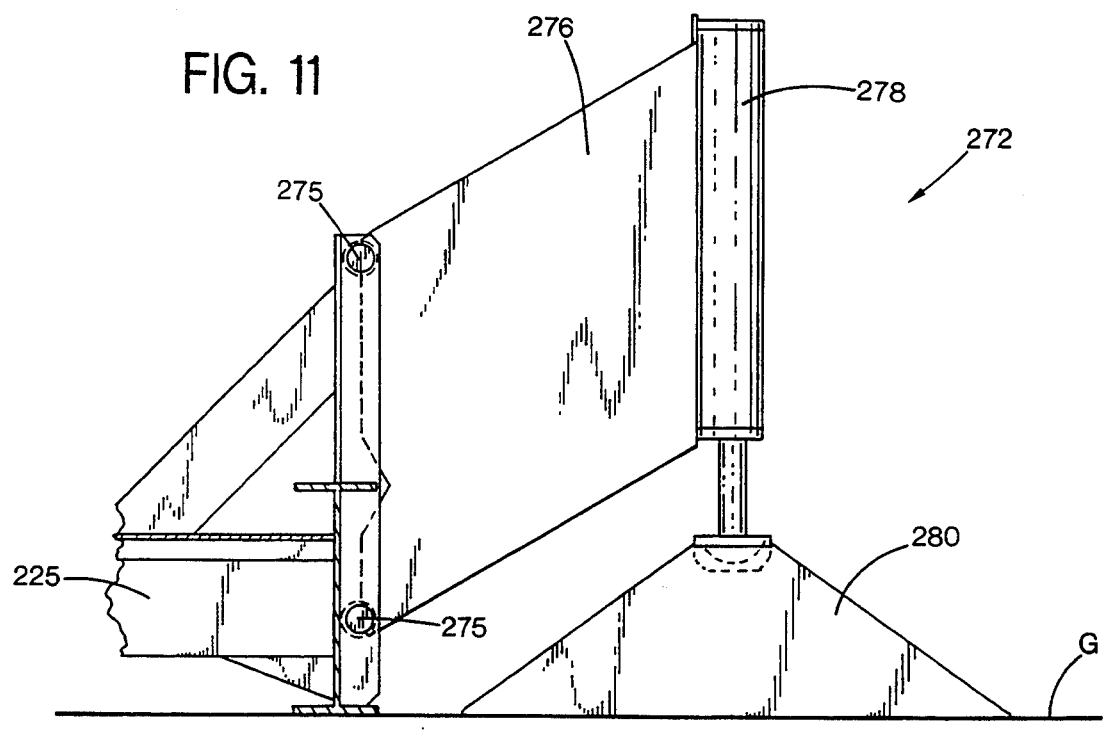
FIG. 11 is a cross-sectional elevational view taken along line 11—11 of FIG. 8.

Referring now to FIGS. 9 and 11, the stabilizing means also includes first and second front end stabilizing means, such as front stabilizers 272 and 274 detachably attached to the tipper sides 211 and 212, respectively, such as by pins 275. The front stabilizers 272 and 274 have wing members 276 and 277, respectively. Hydraulic actuators 278 and 279, terminating in respective ground engaging pads 280 and 281, are attached to the outboard side of the wing members 276 and 277, respectively.

For operating the actuators 278, 279, 268 and 270 of the front and back stabilizers, and deck actuators 249 and 250, the tipper 200 has power means, such as an engine 282 and a hydraulic reservoir 284. The engine 282 and hydraulic reservoir 284 may each be detachably attached to the frame sides 211 and 212, respectively, near the front end 204 of the tipper frame. Thus, the engine 282 and reservoir 284 may advantageously be removed from the frame 202 to narrow the width of the tipper 200 for highway travel. The engine 282 and reservoir 284 are removed from the frame 202 and loaded onto the deck 225, which transfers weight to the center of the tipper 200 for better stability at high speeds. Moreover, mounting the engine 282 and reservoir 284 to the frame sides, rather than underneath the frame as shown above for the power unit 150 of the tipper 10, allows the frame front portion 214 to rest on the ground G to provide a lower profile tipper.

The deck 225 also includes retaining means, such as arches 286 and 288. The arches 286 and 288 are attached to sides 229 and 230 of the deck 225. The arches 286, 288 extend upwardly above the trailer T and prevent the trailer T from prematurely disengaging from the tipper 200 during dumping.

Referring to FIG. 8, a set of stairs 290, mounted to the frame 202, provides access from the ground G to chute means, such as a chute 292, mounted to, and extending rearwardly from, the backstop 236. Referring to FIG. 10, the chute 292 includes two opposing sidewalls 294 and 296 located to each side of an elevated portion 298 of the deck 225. The sidewalls 294 and 296 extend upwardly from the respective deck lateral sides 229 and 230. The chute 292 is sized so that the trailer doors may be swung open to engage the sidewalls 294 and 296 in the same manner as shown in FIG. 1. Latching means (not shown) may be included to secure the trailer doors to the sidewalls 294 and 296 during dumping. It is apparent that the chute 292 may be an independent unit pivotally attached to the deck using elevated pivots 234 and 235, as described above for the pivotal chute 130 of tipper 10 with the hydraulic actuator 140 (FIG. 7).

In operation, the tipper 200 may be used to implement a method of successively removing the contents from a plurality of trailers T. First, the tipper 200 is positioned at a dumping location as shown in FIG. 8. A first trailer T hitched to a first towing vehicle (not shown) is backed onto ramp 240, and from ramp 240 onto the deck 225 and into a dumping position on the deck against the backstop 236. When in position, the trailer is unhitched from the towing vehicle. The trailer doors are opened and latched in place against the chute sidewalls 294 and 296. Of course, the doors could be opened first and the trailer unhitched afterward.

The deck 225 and the chute 292 are raised by extending the deck actuators 249 and 250. In the raised position shown in dashed lines in FIG. 8, the trailer contents fall under the influence of gravity from the trailer through the open doorway. Premature disengagement of the trailer from the deck is prevented by the arches 286 and 288. The trailer contents are guided by the doors and chute 292 to form a first pile (not shown) of dumpable material behind the tipper frame back end 206. In this manner, the first trailer is emptied. The deck 225 is then lowered, with the empty first trailer thereon, to the lower position adjacent the frame upper surface 208.

If required, the first pile is then cleared from behind the tipper 200 as described above with respect to tipper 10. The back doors of the empty first trailer are closed, the trailer is hitched to the first towing vehicle, and then driven off of deck 225 and ramp 240. This leaves the tipper 200 open so a second trailer may be backed by a second towing vehicle into the dumping position on tipper ramp 200, and the dumping sequence repeated. The steps may be repeated with successive trailers to successively remove the contents from a plurality of trailers.

To move the tipper 200 between locations at a given dumping site, the drag cable 222 is hitched to a bulldozer B and the cable assembly 222 lifts the ramp 240 to the skid position 240'. The front stabilizers 272 and 274 are raised by retracting actuators 278 and 279 to disengage the ground G. The back stabilizer pads 264 and 266 are raised by retracting actuators 268 and 270 to disengage the ground surface G. The bulldozer B then drags the tipper 200 to another location at the dump site where the drag cable 222 is removed from the bulldozer B. At the new location, the tipper 200 may be stabilized and leveled by activating the front and rear stabilizer actuators 268, 270, 278 and 279. The front stabilizer actuators 278 and 279 retract to lower the front frame portion 214 to the ground G, which stabilizes the tipper and advantageously reduces the weight load on the front stabilizers 272.

To move the tipper 200 between dump sites where highway travel may be involved, the front stabilizer actuators 278 and 279 are first extended to raise the tipper 200 to a hitching height. The tipper 200 is then hitched to a towing vehicle V, as shown in FIG. 1 for tipper 10. The front and rear stabilizer actuators 268, 270, 278 and 279 are then retracted to disengage the ground G. The front stabilizers 272 and 274 are detached from the frame 202 by removing pins 275, and then loaded onto the deck 225. The rear apron wings 256 and 258, and the apron 255 are also removed from the frame 202 and loaded onto the deck 225. The engine 282 and hydraulic reservoir 284 are also removed and loaded on the deck 225. After raising the ramp 240 to travel position 240" the tipper 200 is ready for highway travel to the new dumping site.

After transporting the tipper 200 from the first dumping site to a second dumping site, the front stabilizers 272 and 274 are unloaded and reattached to tipper frame 202. The engine 282 and hydraulic reservoir 284 are unloaded and reattached to the deck 225, and the hydraulics are coupled to the front stabilizer actuators 278 and 279. The front stabilizer actuators 278 and 279 are extended to raise the tipper for unhitching from the towing vehicle V. After unhitching, the actuators 278 and 279 retract to lower the tipper frame front portion 214 to the ground G. The ramp 240 may then be lowered. The rear apron wings 256 and 258, and the central apron 255 are unloaded and reattached to the tipper back end 206. The tipper 200 may then be stabilized and leveled by activating the front and rear stabilizer actuators 268, 270, 278 and 279. Thus, the tipper 200 is ready to receive and dump trailer T at the new dump site.

Having illustrated and described the principles of our invention with respect to a preferred embodiment, it should be apparent to those skilled in the art that our invention may be modified in arrangement and detail without departing from such principles. For example, other actuating means may be employed, such as pneumatic cylinders. Suitable dimensional variations and materials may be substituted for the components of the tipper system. We claim all such modifications falling within the scope and spirit of the following claims.

We claim:

1. A portable tipper for dumping the contents from a trailer containing a dumpable material through a back opening of the trailer, the tipper comprising:

an elongated tipper frame having front and back ends, first and second lateral sides, and upper and lower frame surfaces;

a deck positioned over said frame having front and back ends, and first and second lateral sides, the deck including a backstop located a first distance from the deck back end for positioning the trailer during dumping;

the tipper frame also having a pivot means positioned above the upper frame surface at the tipper frame back end, pivotally connecting the deck back end to the tipper frame;

elevating means operatively arranged between the deck and the tipper frame for pivotally raising and lowering the deck front end with respect to the upper frame surface; and a chute attached to the deck back end for guiding the dumpable material in a duping direction from the trailer past the deck back end, wherein the chute is pivotally attached to the frame back end with a pivoting chute retracting means coupling the pivoting chute to the frame for pivotally raising and lowering the pivoting chute, so as to pivot the chute from a raised position to a lowered position independent of the raising and lowering of the deck.

2. A portable tipper for dumping the contents from a trailer containing a dumpable material through a back opening of the trailer, the tipper comprising:

an elongated tipper frame having front and back ends, first and second lateral sides, and upper and lower frame surfaces;

a deck positioned over said frame having front and back ends, and first and second lateral sides;

the tipper frame also having a pivotal coupling positioned above the upper frame surface at the tipper frame back end, for pivotally connecting the deck back end to the tipper frame;

elevating means operatively arranged between the deck and the tipper frame for pivotally raising and lowering the deck front end with respect to the upper frame surface; and dragging means for dragging the tipper to various locations at a first dumping site, wherein the dragging means includes a skid plate attached to the lower frame surface near the frame front end for sliding the tipper, and a drag cable assembly attached to the frame front end for attaching the tipper to a transport vehicle.

3. A portable tipper for dumping the contents from a trailer containing a dumpable material through a back opening of the trailer, the tipper comprising:

an elongated tipper frame having front and back ends, first and second lateral sides, and upper and lower frame surfaces, wherein the tipper frame includes a first and second portion, with the second portion inclined with respect to the first portion at a large obtuse angle, and the first portion engaging a ground surface in substantial parallel relation to the ground surface with the second portion of the tipper frame extending upwardly from the ground surface while the tipper is in a dumping position;

a deck positioned over said frame having front and back ends, and first and second lateral sides;

the tipper frame also having a pivotal coupling positioned above the upper frame surface at the tipper frame back end, for pivotally connecting the deck back end to the tipper frame; and elevating means operatively arranged between the deck and the tipper frame for pivotally raising and lowering the deck front end with respect to the upper frame surface.

4. A portable tipper for dumping the contents from a trailer containing a dumpable material through a back opening of the trailer, the tipper comprising:

an elongated tipper frame having front and back ends, first and second lateral sides, an upper frame surface, and a first and second portion, with the second portion inclined with respect to the first portion at a large obtuse angle, and the first portion engaging a ground surface in substantial parallel relation to the ground surface with the second portion of the tipper frame extending upwardly from the ground surface when the tipper frame is in a dumping position;

a deck positioned over said frame having first and second lateral sides, front and back ends, the deck back end being pivotally attached to the second portion of the tipper frame at the back end of the tipper frame; and elevating means operatively arranged between the deck and the tipper frame for pivotally raising and lowering the deck front end between a raised position and a lowered position.

5. A portable tipper according to claim 4 wherein the deck includes a backstop located a first distance from the deck back end for positioning the trailer during dumping.

6. A portable tipper according to claim 4 wherein the elevating means includes a pivotal coupling connecting the upper frame surface to the deck allowing the deck front end to be lowered for retrieving the trailer, and allowing the deck front end to be pivotally elevated above the upper frame surface to the raised position for dumping the trailer contents.

7. A portable tipper according to claim 4 wherein the tipper frame includes a pivot means positioned above the upper frame surface at the tipper frame back end for pivotally connecting the deck back end to the tipper frame.

8. A portable tipper according to claim 4 further including an apron detachably attached to the tipper frame back end for preventing the dumpable material from flowing under the tipper.

9. A portable tipper according to claim 8 further including a pair of vertically movable back stabilizers attached to the apron operable to be lowered to engage the ground surface adjacent the tipper and elevatable to disengage the ground surface on which the tipper rests for moving the tipper, such as to a new dumping location at a first dumping site.

10. A portable tipper according to claim 8 further including side skirts detachably attached to the apron and extending upward from the apron at an angle with respect to the dumping direction of the dumpable material so as to prevent the dumpable material from flowing forwardly from the deck back end.

11. A portable tipper according to claim 9 wherein the apron has two outboard sides, and a pair of wing portions, each wing portion on each outboard side of the apron and extending outward from the tipper back end, wherein each portion is angled forward of the tipper back end such that a rear most edge of each stabilizer is at least forward of the tipper back end.

12. A portable tipper according to claim 4 further including a pair of frame side members detachably attached to the tipper frame at a first distance from the tipper frame front end with a pair of vertically movable front stabilizers mounted to an outboard side of each frame side member operable to be lowered to engage the ground surface adjacent the tipper, the front stabilizers further operable to be raised to disengage the ground surface on which the tipper rests for moving the tipper, such as to a new dumping location at a first dumping site.

13. A portable tipper according to claim 4 further including a ramp pivotally attached to the tipper frame front end so that the ramp may be pivoted upward to a raised position for moving the tipper.

14. A portable tipper according to claim 4 further including highway towing means detachably attached to the tipper frame front end for towing the tipper between sites.

15. A portable tipper according to claim 4 further including a dragging means for dragging the tipper to various locations at a first dumping site.

16. A portable tipper according to claim 15 wherein the dragging means includes a skid plate attached to the lower frame surface near the frame front end for sliding the tipper, and a drag cable assembly attached to the frame front end for attaching the tipper to a transport vehicle.

17. A portable tipper according to claim 4 further including a chute attached to the deck back end for guiding the dumpable material from the trailer past the deck back end.

18. A portable tipper according to claim 17 wherein the chute is pivotally attached to the frame back end with a pivoting chute retracting means coupling the pivoting chute to the frame for pivotally raising and lowering the pivoting chute, so as to pivot the chute from the raised position to the lowered position independent of the raising and lowering of the deck.

19. A portable tipper according to claim 4 further including a plurality of retaining means attached to the first and second lateral sides of the deck, each extending above the trailer when the trailer is on the deck for retaining the trailer on the deck while dumping.

20. A portable tipper according to claim 4 further including:
- a pair of front vertically adjustable stabilizers mounted one along each of the opposite tipper frame lateral sides toward the front end of said tipper frame;
- a pair of back vertically adjustable stabilizers mounted one along each of the opposite tipper frame lateral sides toward the back end of said tipper frame; and
- a power unit mounted to the tipper frame for elevating the front and back stabilizers and the deck.

21. A portable tipper according to claim 20 further wherein the power unit comprises an engine and a hydraulic reservoir, with the engine being detachably attached to the first lateral side of the tipper frame and the hydraulic reservoir being detachably attached to the second lateral side of the tipper frame.

22. A portable tipper for dumping the contents from a trailer containing a dumpable material through a back opening of the trailer, the tipper comprising:
- an elongated tipper frame having front and back ends, first and second lateral sides, an upper frame surface, a first and second portion, with the second portion inclined with respect to the first portion at a large obtuse angle, and the first portion engaging a ground surface in substantial parallel relation with the ground surface while in a dumping position, and a pivot means positioned above the upper frame surface at the tipper frame back end pivotally connecting the deck back end to the tipper frame;
- a deck positioned over said frame having a first and second lateral sides, front and back ends, the deck back end being pivotally attached to the tipper frame back end, including a backstop located a first distance from the deck back end for positioning the trailer during dumping, and including a deck surface laying in an inclined relation relative to the ground surface on which the tipper rests when the deck is in a lowered position adjacent the upper frame surface, with the deck surface being inclined from the deck front end upwardly toward the deck back end;
- elevating means operatively arranged between the frame and the deck for lowering the deck front end to receive the trailer, and for elevating the deck front end above the upper frame surface for dumping the trailer contents;
- a chute attached to the deck back end for guiding the dumpable material from the trailer past the deck back end;
- an apron detachably attached to the tipper frame back end for preventing the dumpable material from flowing under the tipper, including a pair of vertically movable back stabilizers attached to the apron operable to be lowered to engage the ground surface to stabilize the tipper, the back stabilizers being elevatable to disengage the ground surface on which the tipper rests for moving the tipper, further including a pair of wing portions, one wing portion on each outboard side extending outward from the tipper back end, wherein each portion is angled forward the tipper back end such that a rear most edge of each stabilizer is at least forward of the tipper back end, and including side skirts detachably attached to the apron and extending upward from the apron to prevent the dumpable material from flowing forwardly from the deck back end;
- a pair of frame side members detachably attached to the tipper frame at a first distance from the tipper frame front end with a pair of vertically movable front stabilizers mounted to an outboard side of each frame side member operable to be lowered to engage the ground surface adjacent the tipper, the front stabilizers further operable to be raised to disengage the ground surface on which the tipper rests for moving the tipper, such as to a new dumping location at a first dumping site;
- a ramp having a back end pivotally attached to the tipper frame front end so that the ramp may be pivoted upward to a raised position for moving the tipper and be pivoted adjacent the deck front end when the deck is in a lowered position;
- a highway towing means detachably attached to the tipper frame front end for towing the tipper between sites;
- a dragging means, including a skid plate attached to the lower frame surface and a cable assembly attached to the frame front end, for dragging the tipper to various locations at a first dumping site;
- a plurality of retaining means attached to the first and second lateral sides of the deck, each extending above the trailer for retaining the trailer on the deck while dumping; and
- a power means for elevating the front and back stabilizers and the deck, comprising an engine detachably attached to the first lateral side of the tripper frame and a hydraulic reservoir detachably attached to the second lateral side of the tipper frame.

23. A method of transporting a tipper from location to location at a first site using a vehicle, the method comprising the steps of:
 (a) providing a tipper including:
  a tipper frame having a front end and a back end;
  a deck pivotally attached to the tipper frame back end;
  a ramp pivotally attached to the tipper frame front end;
  an apron which is detachably attached to the tipper frame back end;
  frame side members which are detachably attached to the tipper frame at a first distance from the tipper frame front end;
  vertically movable stabilizers attached to the tipper frame and adapted to be lowered to stabilize the tipper by engaging the ground surface adjacent the tipper, with a pair of back stabilizers mounted to the apron and a pair of front stabilizers attached to the outboard side of each frame side member; and
  a dragging means including a skid plate attached to the lower frame surface for sliding the tipper, and a drag cable attached to the frame front end for attaching the tipper to a transport vehicle;
 (b) raising the ramp;
 (c) hitching the drag cable to the transport vehicle;
 (d) raising the front and back stabilizers from engagement with the ground;
 (e) dragging the tipper to another location on the first site;
 (f) stabilizing and leveling the tipper with the front and back stabilizers;
 (g) unhitching the drag cable from the transport vehicle; and
 (h) lowering the ramp.

* * * * *

UNITED STATES PATENT AND TRADEMARK OFFICE
CERTIFICATE OF CORRECTION

PATENT NO. : 5,344,271
DATED : September 6, 1994
INVENTOR(S) : Kenneth A. Bratlie et al.

It is certified that error appears in the above-indentified patent and that said Letters Patent is hereby corrected as shown below:

In the Claims:

Column 13, line 8, "in a duping direction" should read --in a dumping direction--.

Column 14, line 24, "for retrieving the" should read --for receiving the--.

Signed and Sealed this

Twenty-first Day of November, 1995

Attest:

BRUCE LEHMAN

Attesting Officer

Commissioner of Patents and Trademarks